United States Patent [19]

Evans

[11] 4,280,347
[45] Jul. 28, 1981

[54] TORQUE OVERRIDE THREADED LOCKING CAP

[75] Inventor: John H. Evans, Connersville, Ind.
[73] Assignee: Stant Inc., Connersville, Ind.
[21] Appl. No.: 101,154
[22] Filed: Dec. 7, 1979

Related U.S. Application Data

[63] Continuation-in-part of Ser. No. 40,561, May 21, 1979.
[51] Int. Cl.³ .................. B65D 51/16; B65D 55/14
[52] U.S. Cl. .................................... 70/165; 220/210
[58] Field of Search .......... 70/165, 163, 164, 166–173; 220/210

[56] References Cited

U.S. PATENT DOCUMENTS

| 1,701,816 | 2/1929 | Malluk et al. ................ 70/165 X |
| 1,702,205 | 2/1929 | Freedman ...................... 70/165 |
| 4,000,633 | 1/1977 | Evans ............................. 70/165 |
| 4,083,209 | 4/1978 | Sloan, Jr. ....................... 70/165 |
| 4,107,961 | 8/1978 | Evans ............................. 70/165 |
| 4,132,091 | 1/1979 | Aro et al. ....................... 70/165 |

FOREIGN PATENT DOCUMENTS

1190429 10/1959 France ....................................... 70/165

*Primary Examiner*—William E. Lyddane
*Attorney, Agent, or Firm*—Jenkins, Coffey, Hyland, Badger & Conard

[57] ABSTRACT

A locking cap for a threaded filler neck includes a closure member for engaging and closing the neck, a shell providing a hand grip and including a key-actuable lock, and a race disposed for rotation between the shell and closure. The race includes axially inwardly opening pockets, and the closure includes flexible pawl fingers for engaging the pockets to provide a driving connection between the closure and race which is positive in the cap-removal direction and torque-limited in the cap-advancing direction. The race also includes a set of peripherally spaced, radially inwardly projecting teeth. A lock-controlled bolt member mounted in a hub which is connected for rotation with the shell is movable by the lock to a cap-removal position. The bolt member engages driving teeth provided within the closure member. The driving teeth are formed such that rotation of the shell in the cap-advancing direction, after the lock has been returned to the cap-locking position, cams the bolt out of engagement with the driving teeth. The hub also provides a pair of flexible drive fingers for engaging the peripherally spaced and radially inwardly projecting teeth to provide a driving connection between the shell and race which is positive in the cap-advancing direction and torque-limited in the cap-removal direction for free ratcheting of the cap when it is in position on the filler neck and locked.

17 Claims, 9 Drawing Figures

TORQUE OVERRIDE THREADED LOCKING CAP

This is a continuation-in-part of co-pending application Ser. No. 40,561, filed May 21, 1979, assigned to the same assignee as the present invention.

This invention relates to closure caps for vehicle fuel tank threaded filler necks, and particularly to a locking cap having a substantially all-plastic construction and a low axial profile.

Various types of locking gas caps for vehicle fuel tank threaded filler necks are known. See, for example, Summan, U.S. Pat. No. 4,000,632; Evans, U.S. Pat. No. 4,000,633; Sloan Jr., U.S. Pat. No. 4,083,209; Evans, U.S. Pat. No. 4,107,961; and German OLS No. 2,014,130.

It is an object of the present invention to provide a locking cap for a threaded filler neck which is simple and easy to manufacture. The apparatus of the instant invention is constructed largely of molded plastic parts, and is very rugged and sturdy.

According to the invention, the locking fuel tank filler neck cap includes a closure member for threadedly engaging and closing the neck, a shell providing a hand grip and including means for retaining a key-actuable lock, and a race disposed for rotation between the shell and closure. The race includes first engaging means and the closure includes second means for engaging the first engaging means to provide a driving connection between the closure and race which is positive in the cap-removal direction and torque-limited in the direction which advances the cap on the neck. The race further includes a third engaging means, and the shell includes a fourth means for engaging the third engaging means to provide a driving connection which is positive in the cap-advancing direction and torque-limited in the cap-removal direction. The cap further includes bolt means rotatable with the shell and controlled by the lock, and fifth means provided on the closure for engagement by the bolt supported by the bolt means when the lock is moved to the cap-removal position, to permit removal of the cap. The lock may be returned to the cap-locking position without resulting in disengagement of the bolt from the fifth engaging means. This permits the key to be removed from the lock before the cap is replaced on the filler neck, a desirable feature in locking caps of this type. However, once the closure is turned in the cap-advancing direction a predetermined amount, the bolt encounters camming surfaces on the fifth engaging means and is cammed out of engagement with the fifth engaging means.

In illustrative embodiments, the first engaging means comprises at least one axially opening pocket including an inclined camming surface and a locking surface, and the second engaging means comprises at least one flexible finger on the closure, the finger being formed to provide an axially deflectable pawl having an inclined camming surface and a locking surface. The camming surfaces and flexible finger cooperate to provide the torque-limited connection between the closure and race in the cap-advancing direction. The locking surfaces cooperate to provide the positive connection between the closure and race in the cap-removal direction.

Further in the illustrative embodiments, the third engaging means comprises at least one radially inwardly projecting engaging tooth on a radially inwardly facing surface of the race, the tooth including an inclined camming surface and a locking surface. The fourth engaging means includes at least one flexible finger projecting into engagement with the tooth, the finger including a camming surface and a locking surface. The camming surfaces of the tooth and finger and the flexibility of the finger cooperate to provide the torque-limited connection between the race and shell in the cap-removal direction and the locking surfaces thereof cooperate to provide the positive connection between the race and shell in the cap-advancing direction.

The instant structures permit a low axial profile for the threaded fuel tank filler neck cap. These caps require less space for the apparatus required to operate the unlocking and cap-removal mechanism. The shell includes a portion which is integrally and unitarily molded with flexible fingers forming a part of the unlocking mechanism. Much of the cap of the instant invention can be constructed from molded plastic. A distinct advantage of this construction is that such parts can be made quite inexpensively in two-part molds.

The invention may best be understood by referring to the following detailed description and accompanying drawings which illustrate the invention. In the drawings.

Figure 1:
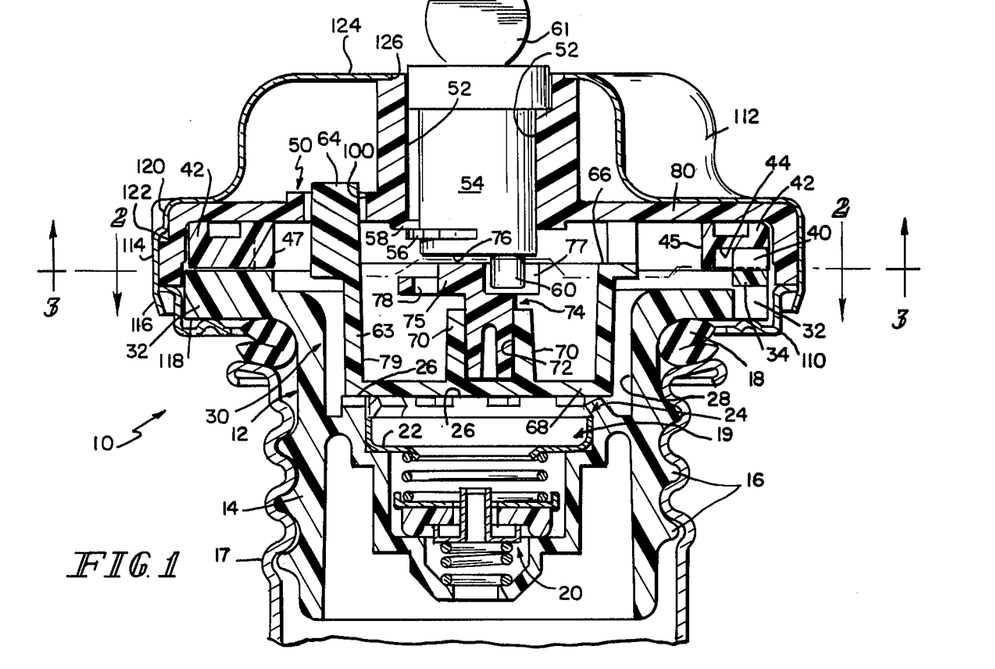
FIG. 1 is an axially sectional side elevational view of a threaded locking gas cap constructed according to the present invention.

Referring now particularly to FIG. 1, the locking cap 10 includes a molded plastic closure member 12 having an axially inwardly extending shank portion 14 which is threaded as indicated at 16 to engage a threaded filler neck 17. Closure 12 includes a gasket 18 which sealably engages the conventional peripherally and radially outwardly extending lip provided by the filler neck 17. Closure 12 further includes a pressure-vacuum vent valve housing 19 into which is assembled a pressure-vacuum vent valve assembly 20. Assembly 20 controls venting of pressure and vacuum which develop within the fuel tank in a manner which is well known. The valve assembly 20 is retained within housing 19 by a cover plate 22 which is press fitted into the axially outer end 24 of housing 19. Closure member 12 further includes an annular supporting wall 26 axially outwardly from housing 19. A generally cylindrical wall region 28 is defined within the axially outer end 30 of closure 12.

Figure 2:
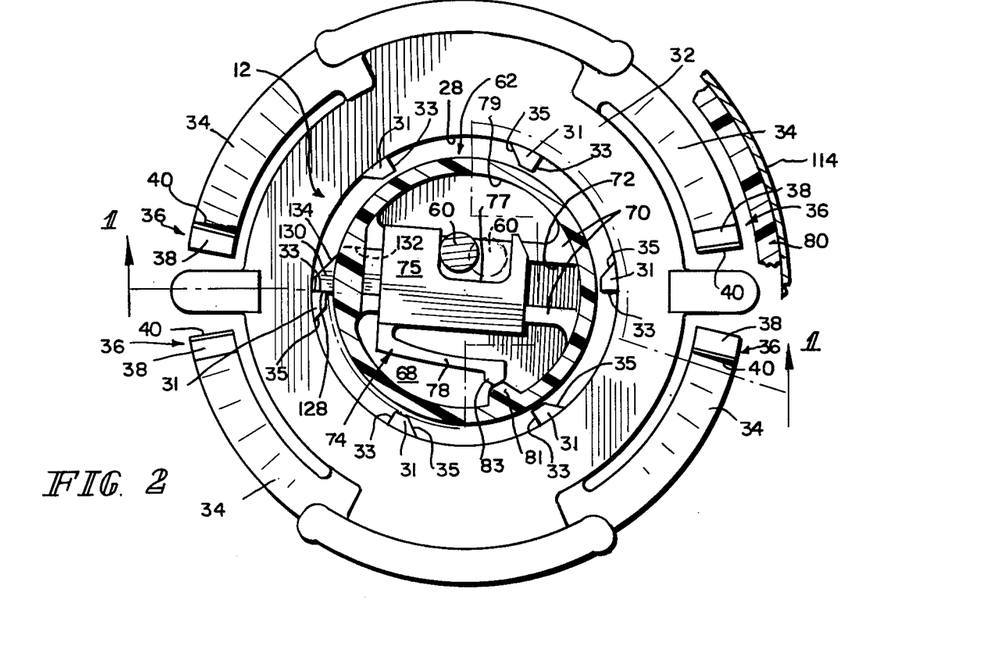
FIG. 2 is a fragmentary sectional view of the cap of FIG. 1, taken generally along section lines 2—2 thereof, and showing the lock in an unlocking, or cap removal, position.

Generally cylidrical wall region 28 is provided with a plurality of radially inwardly extending engaging teeth 31 (see FIG. 2). Each tooth 31 includes a generally radially and axially extending locking surface 33 and a generally chordally and axially extending camming surface 35. Closure 12 also includes a flange 32 at its axially outer end. Flange 32 extends radially outwardly of the axis of closure 12, and includes four peripherally extending resilient fingers 34 (see FIG. 2). Fingers 34 are attached at their proximal ends to flange 32, and are provided at their distal ends with pawl teeth 36. Each tooth 36 has an inclined camming surface 38 and a radially and generally axially extending locking surface 40.

Cap 10 further includes an annular race 42 (see FIGS. 1, 3) which is disposed for rotation within the cap. As can be seen from FIG. 1, race 42 lies directly axially outwardly from flange 32. Race 42 includes a set of peripherally spaced apart, axially inwardly opening pockets 44 (see FIG. 3). Each of pockets 44 includes an inclined camming surface 46, and a radially and axially extending, abrupt locking surface 48. Surfaces 38, 46 of teeth 36 and pockets 44, respectively, cooperate to provide a torque-overriding connection of race 42 to closure 12 in the direction (counterclockwise in FIG. 3) which advances closure 12 into the fuel tank filler neck. Surfaces 40, 48 of teeth 36 and pockets 44, respectively, cooperate to provide the direct connection of race 42 to closure 12 in the direction (clockwise in FIG. 3) which removes closure 12 from the filler neck.

Figures 3, 4, 5:
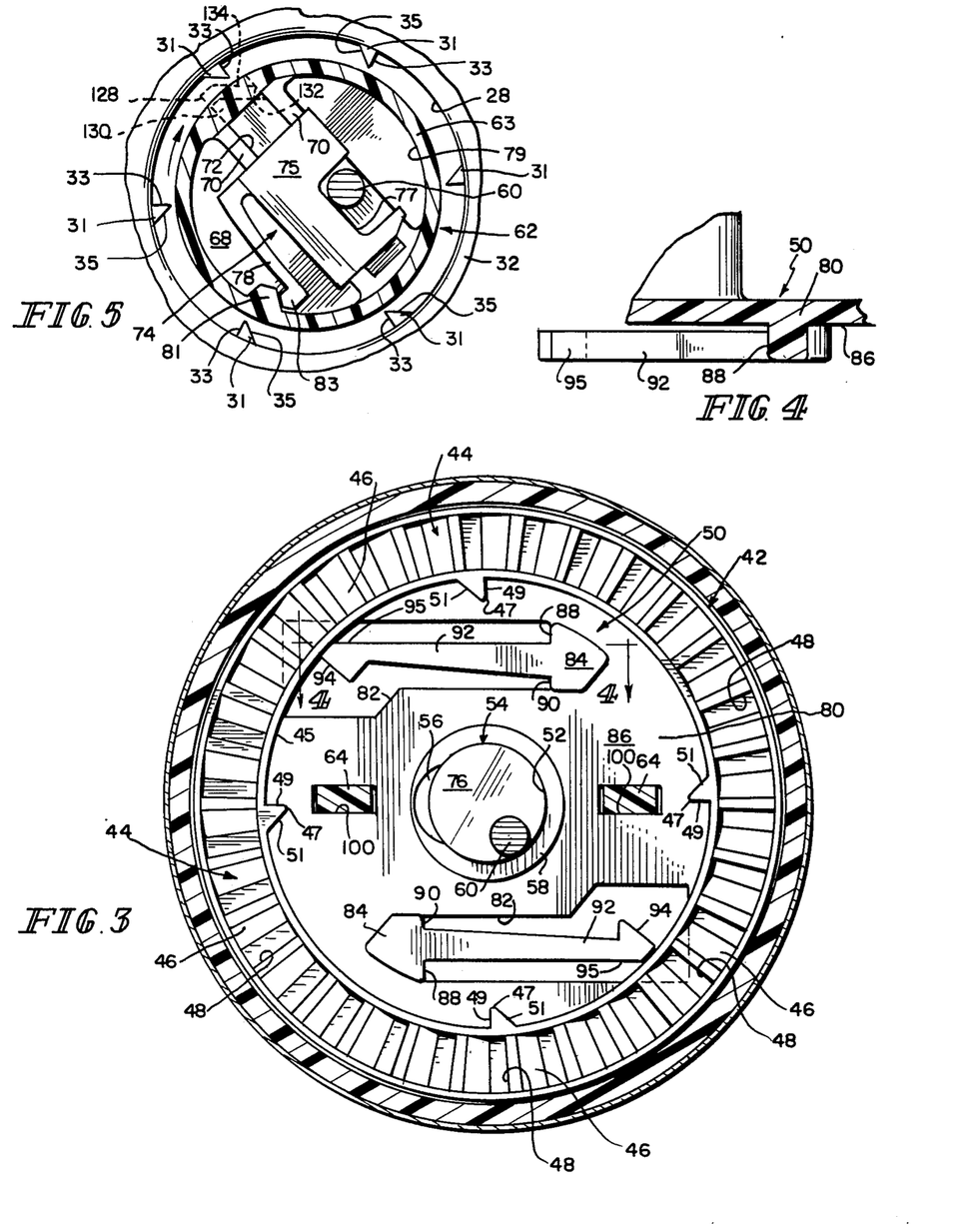
FIG. 3 is a fragmentary sectional view of a detail of the cap of FIG. 1, taken generally along section lines 3—3 thereof.
FIG. 4 is a fragmentary sectional view of a detail of the cap of FIG. 1, taken generally along section lines 4—4 of FIG. 3.
FIG. 5 is a fragmentary sectional view of the cap of FIG. 1, taken generally along section lines 2—2 thereof, with the lock mechanism in a locking position.

Race 42 also includes a radially inwardly facing, peripherally extending surface 45 which is provided with four radially inwardly extending projections 47. Each projection 47 includes an abrupt radially and axially extending driving face 49, and an inclined camming surface 51.

Cap 10 further includes a molded plastic shell member 50 (see FIG. 1) secured to closure member 12 for rotation with respect to the closure member about the axis of cap 10. Race 42 is captured in an annular space provided between shell member 50 and closure 12. Shell member 50 is provided with a central axial opening 52 to accommodate a cylinder lock assembly 54. The cylinder lock assembly 54 is retained within shell member 50 by a locking lug 56 which projects radially outwardly from assembly 54 near its axially inner end to engage a radially inwardly extending cylindrical wall portion 58 of shell member 50. Lock assembly 54 includes an axially extending drive pin 60 which projects from the axially inner end of the lock assembly, and which is actuated by turning the key 61 (FIG. 1) in the lock assembly 54 to move drive pin 60 counterclockwise as viewed in FIG. 2 (from the position illustrated in broken lines to the position illustrated in solid lines) to condition the cap 10 for removal from the filler neck.

Figure 6:
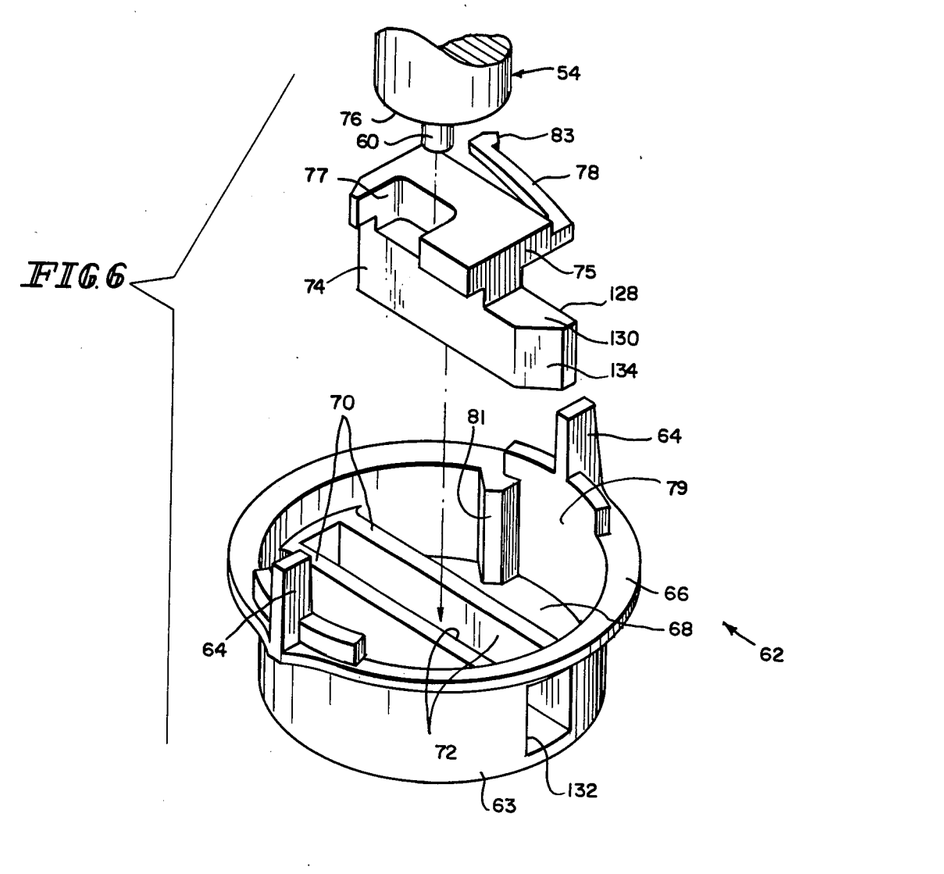
FIG. 6 is an exploded perspective view of a portion of the cap mechanism.

Cap 10 further includes a locking bolt mechanism 62, which is best illustrated in FIGS. 2, 5, and 6. Bolt mechanism 62 includes a generally cup-shaped portion, or hub, 63, and includes axially outwardly extending projections 64 diametrically disposed about the upper annular edge 66 of cup-shaped portion 63 (FIGS. 1, 3, and 6). Projections 64 extend into the molded plastic shell portion 50. The bottom 68 of member 62 is provided with a pair of chordally extending guides 70 defining a bolt slideway 72. A bolt 74 having an enlarged and somewhat rectangular prism-shaped head 75 is slidably guided in the slideway 72 and is held in the slideway between the bottom 68 of portion 63 and the closely spaced axially inner end 76 of the lock assembly 54.

Head 75 defines a notch 77 having dimensions such that rotation of key 61 to the cap-removal position moves the bolt 74 to the position illustrated in FIG. 2. The bolt head 75 further includes a resilient spring-like projection 78 which extends generally longitudinally of the slideway 72 across portion 63. The generally cylindrical interior wall 79 of portion 63 is provided with an axially extending blocking ridge 81 which cooperates with the head 83 of projection 78 on bolt 74 to hold the bolt yieldably in either of two positions which will be described.

Referring now to FIG. 3, a bottom plan view of shell member 50, it will be seen that the outer end 80 of shell member 50 is provided with a pair of windows 82. Windows 82 extend axially through the outer end 80 of shell member 50. A pair of axially inwardly extending projections 84 (FIGS. 3-4) are molded on the axially inner surface 86 of end 80. Axially extending surfaces 88 of projections 84 are coterminous with end edges 90 of windows 82. Resilient molded drive fingers 92 project from surfaces 88 within windows 82. Fingers 92 extend generally along chords of a circle defined by shell member 50. Windows 82 enable fingers 92 to be molded in a simple, two-part mold. Fingers 92 include radially and axially extending engaging surfaces 94 and camming surfaces 95 at their distal ends. The outer end 80 of shell member 50 also includes a pair of diametrically opposed windows 100. Projections 64 extend through windows 100 (see FIGS. 1 and 3) to lock bolt mechanism 62 for rotation with shell member 50.

Closure 12, race 42 and shell member 50 are held in relatively rotatable engagement by a retainer ring 110 (of FIG. 1) and shell cover 112. Ring 110 and shell cover 112 are both constructed from stamped sheet metal, with a depending skirt portion 114 of shell cover 112 being crimped as at 116 to hold ring 110 axially outwardly against the axially inner surface 118 of flange 32. A plurality of radial and axial indentations 120 are stamped into shell cover 112. These indentations 120 correspond in their peripheral locations with a plurality of similar indentations 122 which are molded into shell member 50. Engagement of indentations 120, 122 prevents rotation of shell cover 112 with respect to shell member 50. The axially outer face 124 of shell cover 112 is provided with a central circular aperture 126 through which access is provided to the lock assembly 54.

Turning now to FIGS. 2, 3, 5, and 6, the operation of cap 10 will be explained. Assuming that the cap 10 is to be removed from the filler neck 17, the key 61 is first inserted into the slot in the lock assembly 54 and turned to move pin 60 from its cap-locking position, illustrated in broken lines in FIG. 2, to its cap-removal position, illustrated in solid lines in FIG. 2. This action slides bolt 74 in the slideway 72 from its position illustrated in solid lines in FIG. 5 to its position illustrated in solid lines in FIG. 2. The head 83 of spring-like projection 78 is thereby cammed over the blocking ridge 81. Bolt 74 is thereby held yieldably in the position illustrated in solid lines in FIG. 2, with the locking surface 128 of its end 130 projecting through an opening 132 in side wall 79 of cup-shaped portion 63 to engage the locking surface 33 of one of the engaging teeth 31 provided on the generally cylindrical wall region 28 of closure 12. With the bolt in this position, shell member 50 can be rotated in the cap-removal direction (counterclockwise in FIG. 2, clockwise in FIG. 3). Since the bolt assembly 62 is locked for rotation with the shell member 50 by the engagement of projections 64 in windows 100, such rotation of shell member 50 backs the threads 16 out of engagement with the filler neck 17 and permits the cap 10 to be removed.

Once the key 61 has been rotated to rotate the pin 60 to move the bolt 74 into the position illustrated in solid lines in FIG. 2, the key 61 may be rotated back to move the pin 60 to the position illustrated in broken lines in FIG. 2, so that the key 61 may be removed from the lock assembly 54. The notch 77 on the bolt head 75 is sufficiently large that pin 60 may be in either of the positions illustrated in broken or solid lines in FIG. 2, without moving the bolt 74 from the cap-removal position illustrated in solid lines in FIG. 2 to the cap-locking position illustrated in solid lines in FIG. 5. The bolt 74 is held in the cap-removal position by the cooperation of the head 83 of projection 78 with the blocking ridge 81.

Assuming now that the cap 10 is to be replaced on the filler neck 17 and locked, threads 16 are engaged in neck 17, and the shell member 50 is rotated in the direction which advances cap 10 onto the filler neck 17 (clockwise in FIG. 2 and counterclockwise in FIG. 3). As the shell member 50 is turned, the camming surface 134 at the end 130 of bolt 74 and the camming surface 35 of one of the engaging teeth 31 on the cylindrical wall region 28 of closure 12 engage, causing a thrust on the bolt 74. As this thrust increases, resilient projection 78 flexes to permit the head 83 of projection 78 to cam over the blocking ridge 81 to the position illustrated in solid lines in FIG. 5. The bolt assembly 62 no longer directly engages the closure member 12. However, continued rotation of shell member 50 in the cap-advancing or cap-replacement direction brings engaging surfaces 94 of fingers 92 (FIG. 3) into engagement with driving faces 49 on the race 42 projections 47. Flexing of fingers 92 is blocked by wall 45 of race 42. This establishes the necessary driving connection between shell member 50 and race 42 to drive the race in the cap-advancing, or cap-replacement, direction (clockwise in FIG. 2 and counterclockwise in FIG. 3). This rotation of race 42 is coupled through camming surfaces 46 of pockets 44 in race 42 and the cooperating camming surfaces 38 of fingers 34 on the flange 32 of closure 12 to advance the threads 16 of closure 12 into the filler neck 17. When the threads 16 have been sufficiently advanced into the closure 17, the gasket 18 seals against the lip at the axially outer end of filler neck 17, a break-away torque is reached between camming surfaces 38 on fingers 34 of the closure 12 and camming surfaces 46 of the pockets 44 on the race 42. At this torque, continued rotation of the shell member 50 results in no further rotation of the closure member 12, as the race 42 continues to ratchet on the teeth 36 due to the flexibility of the fingers 34.

Any attempt to remove the cap 10 by rotating shell portions 50, 112 when bolt 74 is in the position illustrated in FIG. 5 causes surfaces 51 of teeth 47 to be engaged by surfaces 95 of fingers 92. As torque is applied to shell portion 50, fingers 92 flex and surfaces 51, 95 ratchet, preventing removal of the cap.

Figure 7:
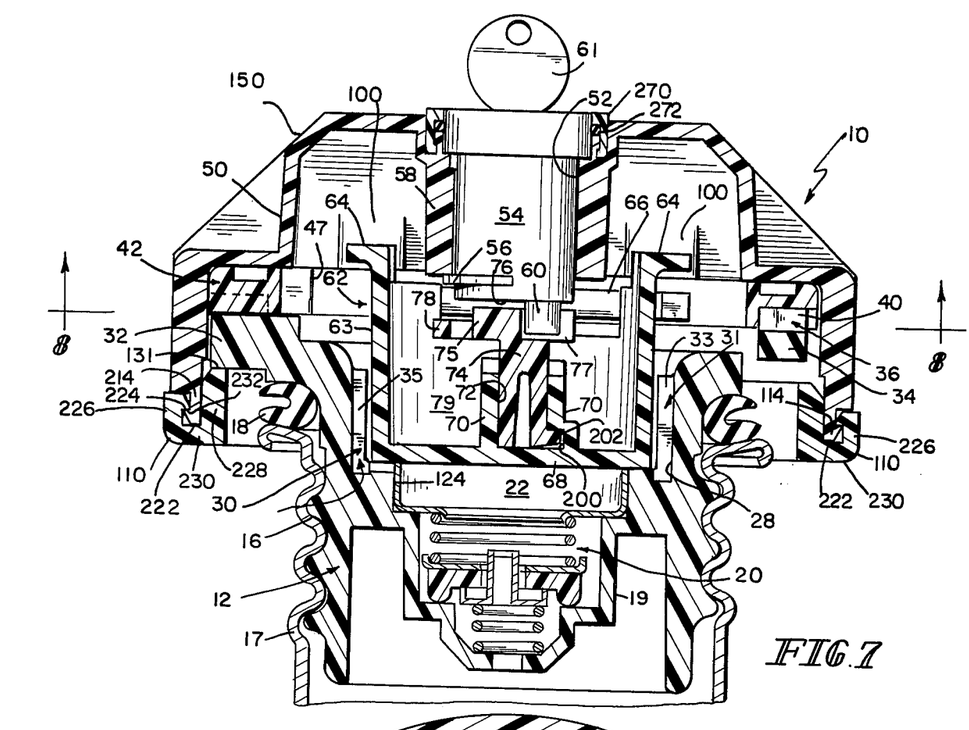
FIG. 7 is an axially sectional side elevational view of another threaded locking gas cap constructed according to the present invention.
Figure 8:
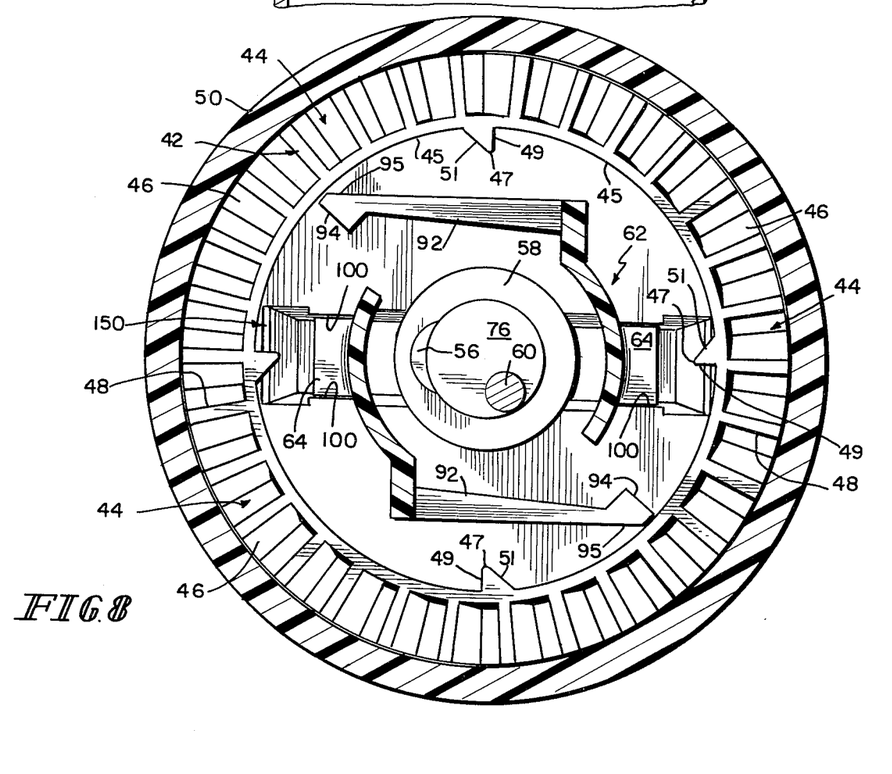
FIG. 8 is a fragmentary sectional view of a detail of the cap of FIG. 7, taken generally along section lines 8—8 thereof.
Figure 9:
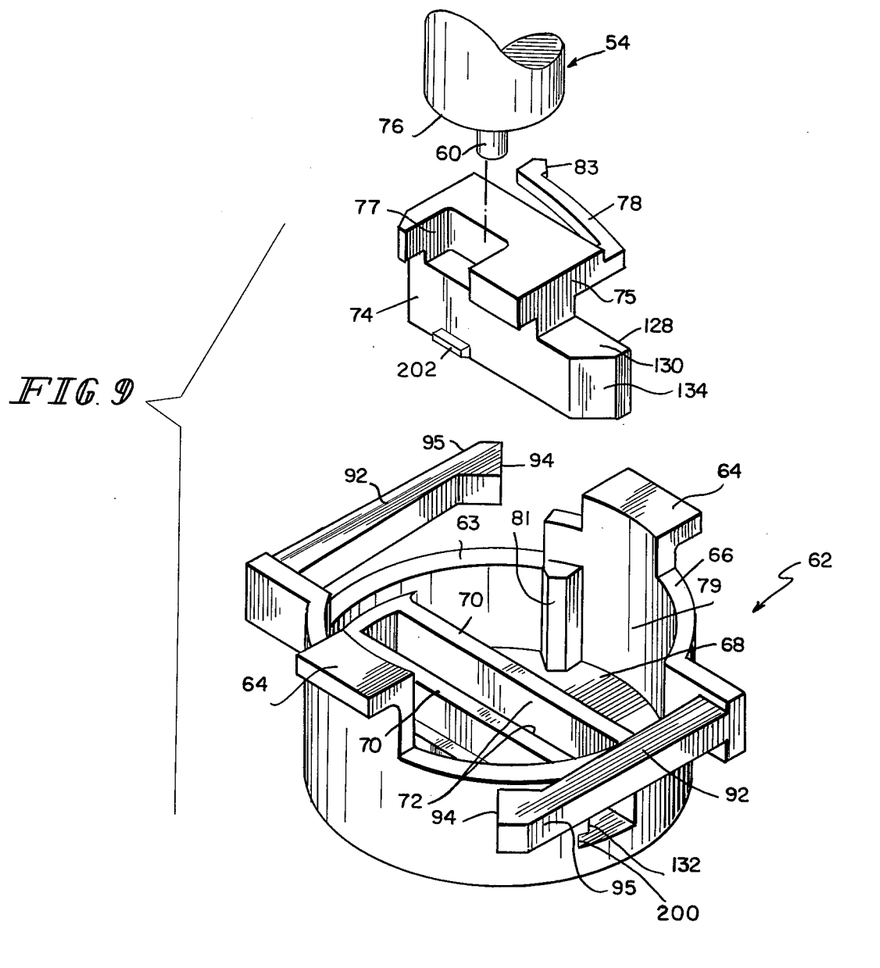
FIG. 9 is an exploded perspective view of a portion of the cap mechanism of FIGS. 7-8.

Referring now particularly to FIGS. 7-9, the embodiment of the invention illustrated in FIGS. 7-9, those elements numbered identically with the elements of the embodiment of FIGS. 1-6 perform the same or similar functions. The locking cap 10 of FIGS. 7-9 is substantially like that of FIGS. 1-6.

However, the shell 50 and locking bolt mechanism 62 of FIGS. 7-9, which is best illustrated in FIGS. 8 and 9, are different from those illustrated in FIGS. 1-6. Bolt mechanism 62 includes a generally cup-shaped portion, or hub, 63, and includes axially outwardly extending projections 64 diametrically disposed about the upper annular edge 66 of cup-shaped portion 63 (FIGS. 8 and 9).

As best seen in FIGS. 7 and 9, slideway 72 includes an axially inward, chordally extending slot 200 formed in one of the chordally extending guides 70. Bolt 74 includes an axially inward projection 202 which slidably engages in groove 200 to keep bolt 74 from being projected axially outwardly in slideway 72 and to improve the assembly of the various components in, for example, upside-down orientation.

Projections 64 extend into diametrically opposed pockets 100 molded into the underside of the hand grip portion 150 of plastic shell portion 50. The axially extending projections 64 also provide resilient molded drive fingers 92. Fingers 92 extend generally along chords of a circle defined by shell member 50. Fingers 92 include radially and axially extending engaging surfaces 94 and camming surfaces 95 at their distal ends. The engagement of projections 64 in pockets 100 locks bolt mechanism 62 for rotation with shell member 50.

Further, the cylinder lock assembly 54 is held in place in shell 50 by a freeze-resistant assembly including a retainer ring 270 and O-ring 272 (FIG. 7).

Closure 12, race 42, and shell member 50 are held in relatively rotatable engagement by a retainer ring 110 and shell depending skirt portion 214. Ring 110 and depending skirt portion 214 of shell 50 are joined by the system described in U.S. Pat. No. 4,091,955. That is, skirt portion 214 includes a radially outwardly extending flange 220 adjacent its axially inner edge 222. Flange 220 provides a peripherally extending, axially outwardly facing surface 224.

Retainer ring 110 includes a radially outer, axially outwardly extending portion 226 and a radially inner, axially outwardly extending portion 228 joined by an axially inner, radially and peripherally extending web portion 230. The flange 32 of closure 12 rests upon surface 131 of portion 228. Portion 226 is provided at its axially outer extent with a surface 232 for supporting closure member 12 and race 42 with pawl teeth 36 in engagement in pockets 44 on race 42. The retainer ring 110 and shell portion 50 of this embodiment resiliently snap together during final assembly of the cap 10 to capture all of the cap components in working engagement.

The operation of the cap illustrated in FIGS. 7-9 is basically the same as that of the cap illustrated in FIGS. 1-6. A difference exists in the function of cap 10 during replacement of the cap of FIGS. 7-9 on the filler neck 17.

Assuming that the cap 10 of FIGS. 7-9 is to be replaced on the filler neck 17 and locked, threads 16 are engaged in neck 17, and the shell member 50 is rotated in the direction which advances cap 10 onto the filler neck 17 (counterclockwise in FIG. 8). With reference to FIG. 9, as the shell member 50 is turned, the camming surface 134 at the end 130 of bolt 74 and the camming surfaces 35 of one of the engaging teeth 31 on the cylindrical wall region 28 of closure 12 engage, causing a thrust on the bolt 74. As this thrust increases, resilient projection 78 flexes to permit the head 83 of projection 78 to cam over the blocking ridge 81 to the position illustrated in solid lines in FIG. 5. The bolt assembly 62 no longer directly engages the closure member 12.

However, continued rotation of shell member 50 in the cap-advancing or cap-replacement direction brings engaging surfaces 94 of fingers 92 (FIG. 8) into engagement with driving faces 49 on the race 42 projections 47. Flexing of fingers 92 is blocked by wall 45 of race 42. This establishes the necessary driving connection between shell member 50 and race 42 to drive the race in the cap-advancing, or cap-replacement, direction (counterclockwise in FIG. 8). This rotation of race 42 is coupled through camming surfaces 46 of pockets 44 in race 42 and the cooperating camming surfaces 38 of fingers 34 on the flange 32 of closure 12 to advance the threads 16 of closure 12 into the filler neck 17. When the threads 16 have been sufficiently advanced into the closure 17, the gasket 18 seals against the lip at the axially outer end of filler neck 17, break-away torque is reached between camming surfaces 38 on fingers 34 of the closure 12 and camming surfaces 46 of the pockets 44 on the race 42. At this torque, continued rotation of the shell member 50 results in no further rotation of the closure member 12, as the race 42 continues to ratchet on the teeth 36 due to the flexibility of the fingers 34.

Any attempt to remove the cap 10 by rotating shell portions 50, 112 when bolt 74 is in the cap-locking position causes surfaces 51 of teeth 47 to be engaged by surfaces 95 of fingers 92. As torque is applied to shell portion 50, fingers 92 flex and surfaces 51, 95 ratchet, preventing removal of the cap.

What is claimed is:

1. A locking cap for a threaded filler neck comprising in combination a threaded closure member for engaging and closing the neck, a key-actuable lock, a shell providing a hand grip and including means for retaining said lock, an annular race disposed for rotation between the shell and closure, the race including first engaging means and the closure including second engaging means for engaging the first engaging means to provide a driving connection between the closure and race which is positive in the cap-removal direction and torque-limited in the cap-advancing direction, the race further including third engaging means, the shell including a hub mounted for rotation with the shell hand grip portion and providing fourth engaging means for engaging the third engaging means to provide a driving connection between the third and fourth engaging means which is positive in the cap-advancing direction and torque-limited in the cap removal direction, bolt means mounted for rotation with the shell, and fifth engaging means on the closure, the bolt means being actuable by key actuation of the lock for movement into engagement with the fifth engaging means to couple the bolt means and shell directly to the closure to permit removal of the cap from the filler neck.

2. The cap of claim 1 wherein the third engaging means comprises at least one radially inwardly projecting engaging tooth on a radially inwardly facing surface of the race, the tooth including an inclined camming surface and a locking surface, the fourth engaging means provided on the hub includes at least one flexible finger integrally and unitarily molded to the shell portion for projecting into engagement with the tooth, the finger including a camming surface and a locking surface, the camming surfaces of the tooth and finger and the flexibility of the finger cooperating to provide the torque-limited connection between the race and shell in the cap-removal direction and the locking surfaces of the tooth and finger cooperating to provide the positive connection between the race and shell in the cap-advancing direction.

3. The cap of claim 2 wherein there are a pair of such flexible drive fingers, and the hub is generally concentric with the race and positioned within the race, the fingers being mounted at generally diametrically opposed points on the hub, the fingers extending generally along chords of a circle defined by the race and terminating at generally diametrically opposed points within the race.

4. The cap of claim 1 wherein the hub includes a cup-shaped member extending axially inwardly from the shell into the closure, and the bolt means includes means in the cup-shaped member providing a slideway which extends generally chordally across the cup-shaped member, a bolt slidable in the slideway between a position in engagement with the fifth engaging means to permit cap removal and a position out of engagement with the fifth engaging means to prevent removal of the cap, the cup-shaped member having a generally cylindrical side wall including means defining an opening through which the bolt projects when in position to engage the fifth engaging means, the bolt means further including means providing a yieldable spring extending from the bolt, and stop means provided on the generally cylindrical wall of the cup-shaped member, the yieldable spring including a head cooperating with the stop means yieldably to hold the bolt in either of said two positions.

5. The cap of claim 4 in which the bolt includes a bolt end having a locking surface and a camming surface, and the fifth engaging means includes an engaging tooth on the closure, the engaging tooth having a locking surface and a camming surface, the locking surfaces of the bolt and fifth engaging means tooth cooperating when the bolt is in the cap-removal position and the shell is rotated in a cap-removal direction to permit removal of the cap, and the camming surfaces of the bolt and fifth engaging means tooth cooperating when the bolt is in the cap-removal position and the shell is rotated in a cap-advancing direction to overcome the spring force and drive the spring head over the stop means and move the bolt to the cap-locking position.

6. The cap of claim 5 in which the lock includes a drive pin and the bolt includes a head defining a slot for receiving the drive pin, rotation of the key in the lock in one direction moving the pin in the slot to move the bolt to the cap-removal position, the slot being sized to permit rotation of the key in the opposite direction without moving the bolt back to the cap-locking position to permit removal of the key from the lock while the bolt remains in the cap-removal position.

7. In a locking cap for a fuel tank threaded filler neck, the cap including a gasket subject to damage due to overtightening of the cap on the neck, a lock for controlling cap removal, a shell providing a hand grip, a threaded closure for enaging the filler neck to close it, and first and second engaging means providing a torque-limited connection between the shell and the closure in a direction to advance the cap into the filler neck to protect the gasket, third engaging means positively drivingly connected to the closure in the cap-removal direction and a hub providing fourth engaging means, the hub including means for coupling it for rotation with the shell, the third and fourth engaging means positively engaging one another in the cap-advancing direction and cooperating to provide a torque-limited connection in the cap-removal direction, the hub supporting lock-actuated bolt means, and the closure including cooperating fifth engaging means for selectively coupling the hub to the closure for cap removal.

8. The cap of claim 7 wherein the third engaging means comprises at least one radially inwardly projecting engaging tooth formed on a radially inwardly facing surface of an annular race axially positioned between the shell and closure, the tooth including an inclined camming surface and a locking surface, the hub includes a molded plastic portion, and the fourth engaging means includes at least one flexible finger integrally and unitarily formed on said molded plastic hub portion, the finger projecting into engagement with the tooth, the finger including a camming surface and a locking surface, the camming surfaces of the tooth and finger and the flexibility of the finger cooperating to provide the torque-limited connection between the race and shell in the cap-removal direction and the locking surfaces thereof cooperating to provide the positive connection between the race and shell in the cap-advancing direction.

9. The cap of claim 8 wherein the molded plastic hub portion comprises a cup-shaped member extending axially inwardly from the shell into the closure, and the bolt means includes a slideway provided in the cup-shaped member to extend generally chordally across the cup-shaped member, a bolt slidable in the slideway between a position in engagement with the fifth engaging means to permit cap removal and a position out of engagement with the fifth engaging means to prevent removal of the cap, the cup-shaped member having a generally cylindrical side wall including means defining an opening through which the bolt projects when in position to engage the fifth engaging means, the bolt means further including means providing a yieldable spring extending from the bolt, and stop means provided on the generally cylindrical wall of the cup-shaped member, the yieldable spring including a head cooperating with the stop means yieldably to hold the bolt in either of said two positions.

10. The cap of claim 9 in which the bolt includes a bolt end having a locking surface and a camming surface, and the fifth engaging means includes an engaging tooth on the closure, the engaging tooth having a locking surface and a camming surface, the locking surfaces of the bolt and fifth engaging means tooth cooperating when the bolt is in the cap-removal position and the shell is rotated in a cap-removal direction to permit removal of the cap, and the camming surfaces of the bolt and fifth engaging means tooth cooperating when the bolt is in the cap-removal position and the shell is rotated in a cap-advancing direction to overcome the spring force and drive the spring head over the stop means and move the bolt to the cap-locking position.

11. The cap of claim 10 in which the lock includes a drive pin and the bolt includes a head defining a slot for receiving the drive pin, rotation of the key in the lock in one direction moving the pin in the slot to move the bolt to the cap-removal position, the slot being sized to permit rotation of the key in the opposite direction without moving the bolt back to the cap-locking position to permit removal of the key from the lock while the bolt remains in the cap-removal position.

12. The cap of claim 8 wherein there are a pair of such flexible drive fingers, the fingers being mounted at generally diametrically opposed points on the molded plastic hub portion, the fingers extending generally along chords of a circle defined by the race and terminating at generally diametrically opposed points within the race.

13. A locking cap for a threaded filler neck comprising a closure member for engaging and closing the neck, a shell providing a hand grip and including a lock, and a race disposed for rotation between the shell and closure, the race cooperating with the closure member to provide a positive connection in the cap-removal direction and a torque-limited connection in the cap-advancing direction, the race further including engaging means, a hub positioned concentrically within the race and including means for coupling the hub for rotation with the shell, the hub including a portion for providing at least one flexible drive finger for engaging the engaging means on the race to provide a positive connection in the cap-advancing direction and a torque-limited connection in the cap-removal direction, the cap further including a lock-controlled bolt member, the lock-controlled bolt member being connected to the hub for rotation with the shell, and means for selective engagement by the bolt member, the selective engagement means provided on the closure, movement of the lock to the cap-removal position permitting the bolt member to engage the selective engagement means to connect the shell directly to the closure, subsequent rotation of the shell in the cap-removal direction rotating the closure to permit its removal from the filler neck.

14. The cap of claim 13 wherein the hub comprises a cup-shaped member extending axially inwardly from the shell into the closure, and the bolt member comprises a slideway provided in the cup-shaped member to extend generally chordally across the cup-shaped member, a bolt slidable in the slideway between a position in engagement with the fifth engaging means to permit cap removal and a position out of engagement with the fifth engaging means to prevent removal of the cap, the cup-shaped member having a generally cylindrical side wall including means defining an opening through which the bolt projects when in position to engage the fifth engaging means.

15. The cap of claim 14 wherein the bolt member further includes means providing a yieldable spring extending from the bolt, and stop means provided on the generally cylindrical wall of the cup-shaped member, the yieldable spring including a head cooperating with the stop means yieldably to hold the bolt in either of said two positions.

16. The cap of claim 15 in which the bolt includes a bolt end having a locking surface and a camming surface, and the fifth engaging means includes an engaging tooth on the closure, the engaging tooth having a locking surface and a camming surface, the locking surfaces of the bolt and fifth engaging means tooth cooperating when the bolt is in the cap-removal position and the shell is rotated in a cap-removal direction to permit removal of the cap, and the camming surfaces of the bolt and fifth engaging means tooth cooperating when the bolt is in the cap-removal position and the shell is rotated in a cap-advancing direction to overcome the spring force and drive the spring head over the stop means and move the bolt to the cap-locking position.

17. The cap of claim 16 in which the lock includes a drive pin and the bolt includes a head defining a slot for receiving the drive pin, rotation of the key in the lock in one direction moving the pin in the slot to move the bolt to the cap-removal position, the slot being sized to permit rotation of the key in the opposite direction without moving the bolt back to the cap-locking position to permit removal of the key from the lock while the bolt remains in the cap-removal position.

* * * * *